United States Patent
Kelley

(10) Patent No.: US 11,911,774 B2
(45) Date of Patent: Feb. 27, 2024

(54) CARPET RECYCLING PROCESS AND METHOD

(71) Applicant: David Kelley, Knoxville, TN (US)

(72) Inventor: David Kelley, Knoxville, TN (US)

(*) Notice: Subject to any disclaimer, the term of this patent is extended or adjusted under 35 U.S.C. 154(b) by 208 days.

(21) Appl. No.: 17/078,384

(22) Filed: Oct. 23, 2020

(65) Prior Publication Data

US 2021/0138480 A1 May 13, 2021

Related U.S. Application Data

(60) Provisional application No. 62/934,852, filed on Nov. 13, 2019.

(51) Int. Cl.
| | | |
|---|---|---|
| *B02C 23/36* | (2006.01) | |
| *B02C 23/38* | (2006.01) | |
| *B02C 18/00* | (2006.01) | |
| *B09B 5/00* | (2006.01) | |
| *B02C 18/06* | (2006.01) | |
| *B02C 19/00* | (2006.01) | |
| *B02C 23/14* | (2006.01) | |

(52) U.S. Cl.
CPC .......... *B02C 23/36* (2013.01); *B02C 18/0084* (2013.01); *B02C 18/06* (2013.01); *B02C 19/0056* (2013.01); *B02C 23/14* (2013.01); *B02C 23/38* (2013.01); *B09B 5/00* (2013.01); *B02C 2201/06* (2013.01)

(58) Field of Classification Search
CPC ......... B02C 23/38; B02C 23/18; B02C 23/36; B02C 23/12
See application file for complete search history.

(56) References Cited

U.S. PATENT DOCUMENTS

| | | | | |
|---|---|---|---|---|
| 5,722,603 A | * | 3/1998 | Costello | B29B 17/02 241/DIG. 38 |
| 6,029,916 A | * | 2/2000 | White | B29B 17/02 241/24.19 |
| 6,752,336 B1 | * | 6/2004 | Wingard | B29B 17/0412 241/24.19 |
| 7,635,099 B1 | * | 12/2009 | Meredith | B29B 17/02 241/24.19 |
| 9,156,035 B1 | * | 10/2015 | Horton | B03B 9/065 |
| 9,676,917 B1 | | 6/2017 | Tian et al. | |
| 10,576,478 B2 | | 3/2020 | Tian et al. | |
| 2013/0174517 A1 | * | 7/2013 | Kelley | B02C 23/00 53/399 |
| 2014/0312526 A1 | * | 10/2014 | Kwak | B02C 23/08 264/328.17 |

(Continued)

FOREIGN PATENT DOCUMENTS

WO WO2018089331 A1 5/2018

*Primary Examiner* — Faye Francis
(74) *Attorney, Agent, or Firm* — Blanchard Horton PLLC

(57) ABSTRACT

A carpet recycling method is disclosed. In a toroidal flow pulper, pieces of carpet are disintegrated in a quantity of liquid to form a slurry of fibrous carpet materials and carpet ash. At least a portion of the fibrous carpet materials are separated from the slurry, and the separated fibrous carpet materials are dried. At least a portion of the carpet ash is isolated from the slurry, and the isolated carpet ash is dried. Thus, a first output comprising dried separated fibrous carpet materials is produced, and a second output comprising dried carpet ash is produced.

16 Claims, 7 Drawing Sheets

(56) References Cited

U.S. PATENT DOCUMENTS

2016/0016176 A1\* 1/2016 Melick .................... B02C 17/20
   241/21
2018/0127562 A1 5/2018 Tian et al.
2020/0156082 A1 5/2020 Tian et al.

\* cited by examiner

CARPET RECYCLING PROCESS AND METHOD

CROSS-REFERENCE TO RELATED APPLICATIONS

This application claims priority to U.S. Provisional Patent Application No. 62/934,852, filed on Nov. 13, 2019, which is incorporated herein in its entirety by reference.

STATEMENT REGARDING FEDERALLY-SPONSORED RESEARCH OR DEVELOPMENT

Not Applicable

BACKGROUND OF THE INVENTION

1. Field of Invention

The invention relates to methods and processes useful in recycling carpet. More particularly, this invention relates to methods and processes whereby carpet is reduced into component materials by separating carpet fibers in the carpet from calcium carbonate that forms the backing material of the carpet.

2. Description of the Related Art

The concept of recycling and reclaiming waste materials and refuse for use in starting material for new products is well known. Environmental concerns and landfill regulations have placed an increasing emphasis on the need to recycle and decrease waste in the manufacturing of goods and products. Furthermore, manufacturing processes that utilize recycled goods can also decrease manufacturing costs, thereby lowering the price of the goods.

There is a growing awareness of the need to reclaim raw materials from used carpets for use as starting materials in numerous industries. According to the Carpet America Recovery Effort's 2010 Annual Report statistics, over six (6) billion pounds of carpet were discarded in 2010. Of those six (6) billion pounds of discarded carpet, less than one (1) billion pounds were recycled. Over four and one-half (4½) billion pounds were placed in landfills. Accordingly, there is a continuing need for new efficient and convenient methods and devices for recycling carpet.

Generally, carpets comprise fibrous materials and backing materials which may be separated and harvested for reuse, either as starting material for the manufacture of new carpet or as raw material for other products. More specifically, many modern carpets comprise fibers which are fabricated from nylon, polypropylene, polyethylene tetraphthalate (PET), or other such materials, together with a backing which usually includes polypropylene, calcium carbonate, and latex glue. In the field of recycling carpet, emphasis is placed on reclaiming nylon fibers from carpet due to the relative cost of nylon in comparison to the other materials discussed above. However, in order to reclaim nylon from carpet such that the reclaimed nylon may be used in the manufacture of other products, the nylon must be separated from the backing materials to which it is typically adhered. Furthermore, there is at least some interest in the industry in reclaiming other components of carpet, such as for example polypropylene and calcium carbonate.

Several carpet recycling processes are well known in the art. For instance, one method of recycling carpet includes sending the carpet through a machine which shaves nylon fibers from the backing material in the carpet. However, this method typically results in reclamation of only that portion of the nylon fibers in the carpet which protrude beyond a threshold distance from the backing material. Thus, a significant percentage of the nylon fibers in the carpet must be discarded along with the backing material. Carpet recycling processes of this type do not provide for the reclamation and recycling of any of the above-discussed component materials of the backing, such as for example polypropylene, calcium carbonate, etc.

U.S. Pat. No. 7,635,099 issued to Meredith et al. teaches another method of recycling carpet, whereby carpet pieces are shredded, screened to separate fibrous materials from backing materials, and then introduced into a liquid slurry and centrifuged. However, the method disclosed in Meredith et al. is limited in its ability to separate calcium carbonate in the backing material of carpet from nylon fibers in the carpet. Furthermore, none of the above-discussed prior art processes are capable of immediate breakdown and recycling of wet carpet. This presents an issue when, for instance, a carpeted building is flooded and replacement of carpet in the flooded building and recycling of the wet carpet is desired. The carpet in the flooded building becomes wet, and is therefore no longer capable of being recycled through the above-discussed known processes. Thus, instead of the carpet's components being recycled and reclaimed for use as starting material, the wet carpet rolls are often placed in a landfill, resulting in significant material waste.

In light of the above, there is a need in the art for a carpet recycling process that is capable of receiving either wet or dry carpet rolls and separating the various component materials forming the carpet fibers and the backing material from one another for use as starting material for other products and processes.

BRIEF SUMMARY OF THE INVENTION

The present general inventive concept provides a carpet recycling process and method which is capable of receiving either wet or dry carpet rolls and separating the various component materials forming the carpet fibers and the backing material from one another for use as starting material for other products and processes. Various embodiments of the present general inventive concept may be achieved by dividing a carpet into a plurality of pieces, and thereafter, in a toroidal flow pulper, disintegrating the pieces of carpet in a quantity of liquid to form a slurry of liquid, fibrous carpet materials, and carpet ash. A first separation operation may be performed to separate at least a portion of the liquid and carpet ash from the fibrous carpet materials. The fibrous carpet materials may be dried, and at least a portion of the carpet ash may be isolated from the liquid. The isolated carpet ash may be dried. Thus, a first output comprising dried separated fibrous carpet materials and a second output comprising dried carpet ash may be produced.

Further embodiments in accordance with the present general inventive concept may be achieved in which the operation of dividing the carpet into a plurality of pieces comprises shredding the carpet into a plurality of pieces less than three inches by three inches in area. Additional embodiments may be achieved in which the operation of dividing the carpet into a plurality of pieces further comprises, in at least one crushing mill, crushing the shredded carpet, and removing a portion of crushed carpet ash from the shredded and crushed carpet.

Further embodiments in accordance with the present general inventive concept may be achieved in which after the first separation operation, the fibrous carpet materials are refined to liberate at least a portion of the carpet ash remaining in the fibrous carpet materials following the first separation operation, and a second separation operation is performed to separate at least a portion of the liberated carpet ash from the fibrous carpet materials.

Additional embodiments in accordance with the present general inventive concept may be achieved in which the second separation operation comprises, in a basket centrifuge, spinning the fibrous carpet materials in order to separate liquid and liberated carpet ash from the fibrous carpet materials by density. Additional embodiments in accordance with the present general inventive concept may be achieved in which the toroidal flow pulper comprises a tank sized and shaped to receive the carpet and the quantity of liquid, and a pulper in fluid communication with the tank. Certain embodiments in accordance with the present general inventive concept may be achieved in which the toroidal flow pulper further comprises a stationary stator and a rotatable rotor having a plurality of blades defined thereon, the rotor being nested within and cooperating with the stator to define a reduction and attrition zone therebetween, the rotor being coupled to a drive shaft, the drive shaft being in operable communication with a motor configured to rotate the drive shaft and the rotor. In certain such embodiments, rotation of the rotor in relation to the stator may operate to shear the carpet while simultaneously drawing the liquid and the carpet into and through the reduction and attrition zone, thereby disintegrating the carpet to form the slurry.

Further embodiments in accordance with the present general inventive concept may be achieved in which the operation of disintegrating carpet is performed by placing the carpet and the quantity of liquid in the tank of the toroidal flow pulper, rotating the rotor in relation to the stator, pumping the carpet and the liquid through the reduction and attrition zone, thereby shearing the carpet; and recirculating the sheared carpet and the liquid to the tank.

Additional embodiments in accordance with the present general inventive concept may be achieved in which the dried separated fibrous carpet materials are packaged into transportable units. In certain such embodiments, the operation of packaging the dried separated fibrous carpet materials may be performed by compacting the dried and separated fibrous carpet materials into a pellet.

Additional embodiments in accordance with the present general inventive concept may be achieved in which the operation of separating at least a portion of the liquid and carpet ash from the fibrous carpet materials comprises placing the slurry in a screening chamber defining a series of apertures sized to allow the liquid and the carpet ash to pass through the apertures but to limit the fibrous carpet materials from passing therethrough, agitating the screening chamber, and applying additional liquid to an interior of the screening chamber to urge the liquid and the carpet ash through the apertures. Additional embodiments in accordance with the present general inventive concept may be achieved in which the operation of isolating at least a portion of the carpet ash from the liquid comprises placing the liquid and carpet ash in a hydrocyclone defining a conically-shaped chamber adapted to rotate about a central axis thereof, rotating the chamber of the hydrocyclone, thereby urging circulating separation of the at least one portion of the carpet ash from the liquid of the slurry, and allowing at least one portion of the carpet ash to fall from a lower portion of the chamber. Additional embodiments in accordance with the present general inventive concept may be achieved in which the operation of drying the isolated carpet ash is performed by processing the isolated carpet ash through at least one of a vacuum filter and a thermal drying apparatus.

Additional embodiments in accordance with the present general inventive concept may be achieved in which at least one of the operations of drying the separated fibrous carpet materials, isolating at least a portion of the carpet ash from the slurry, and drying the isolated carpet ash produces a third output comprising the liquid. Additional embodiments in accordance with the present general inventive concept may be achieved in which the third output is directed to the toroidal flow pulper for use in disintegrating additional carpet.

Various embodiments in accordance with the present general inventive concept may be achieved in which an output of liquid and carpet ash from the first separation operation is combined with an output of liquid and liberated carpet ash from the second separation operation to form a combined liquid and carpet ash output. Various embodiments in accordance with the present general inventive concept may be achieved in which the combined liquid and carpet ash output is filtered to form an output of filtered liquid and an output of carpet ash. Various embodiments in accordance with the present general inventive concept may be achieved in which the filtered liquid is directed to the toroidal flow pulper for use in disintegrating additional carpet.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
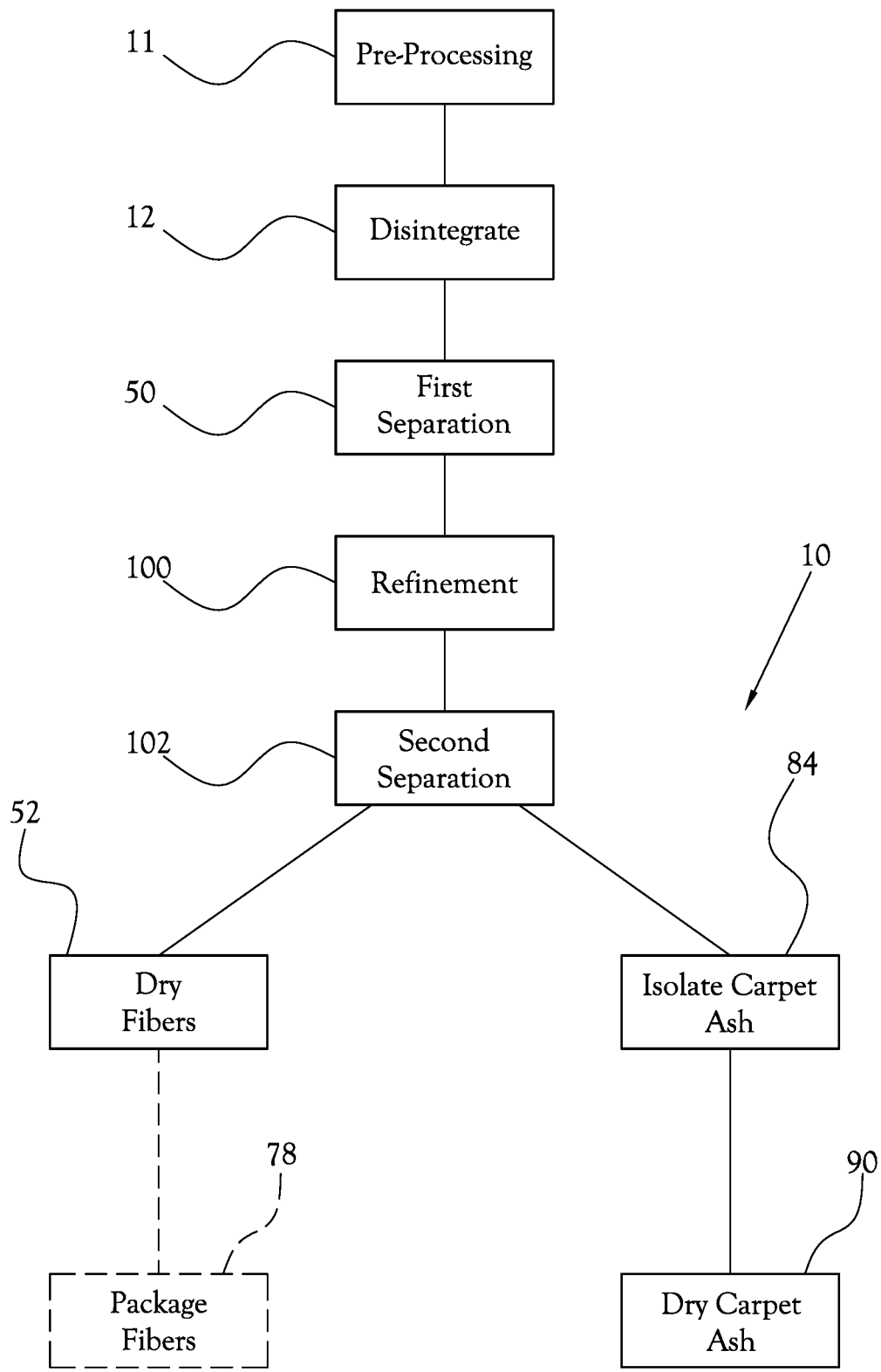
FIG. 1 is a flow diagram showing one embodiment of a carpet recycling process and method in accordance with several features of the present general inventive concept.

A carpet recycling process and method, in accordance with several features of the present general inventive concept, is disclosed herein and in the accompanying figures. One embodiment of a carpet recycling process and method is shown schematically at 10 in FIG. 1. For ease of reference, the term "method" will be used hereinbelow to refer generally to various embodiments of a carpet recycling process and associated method in accordance with several features of the present general inventive concept. In the embodiment of FIG. 1, one embodiment of a method 10 begins by pre-processing 11 a raw carpet, of the type that includes generally a backing comprising carpet ash and a pile comprising mixed carpet fibers. As used herein, "carpet fibers" or "mixed carpet fibers" refers to nylon and/or polypropylene fibers that comprise the carpet pile. Further, "carpet ash" refers primarily to the calcium carbonate used in the adhesive that secures the carpet fibers to the carpet backing, as well as to the latex backing itself and any other substances or materials that may settle in the carpet as a result of the normal traffic and wear, such as, for example, dirt and dust particles.

Figure 2:
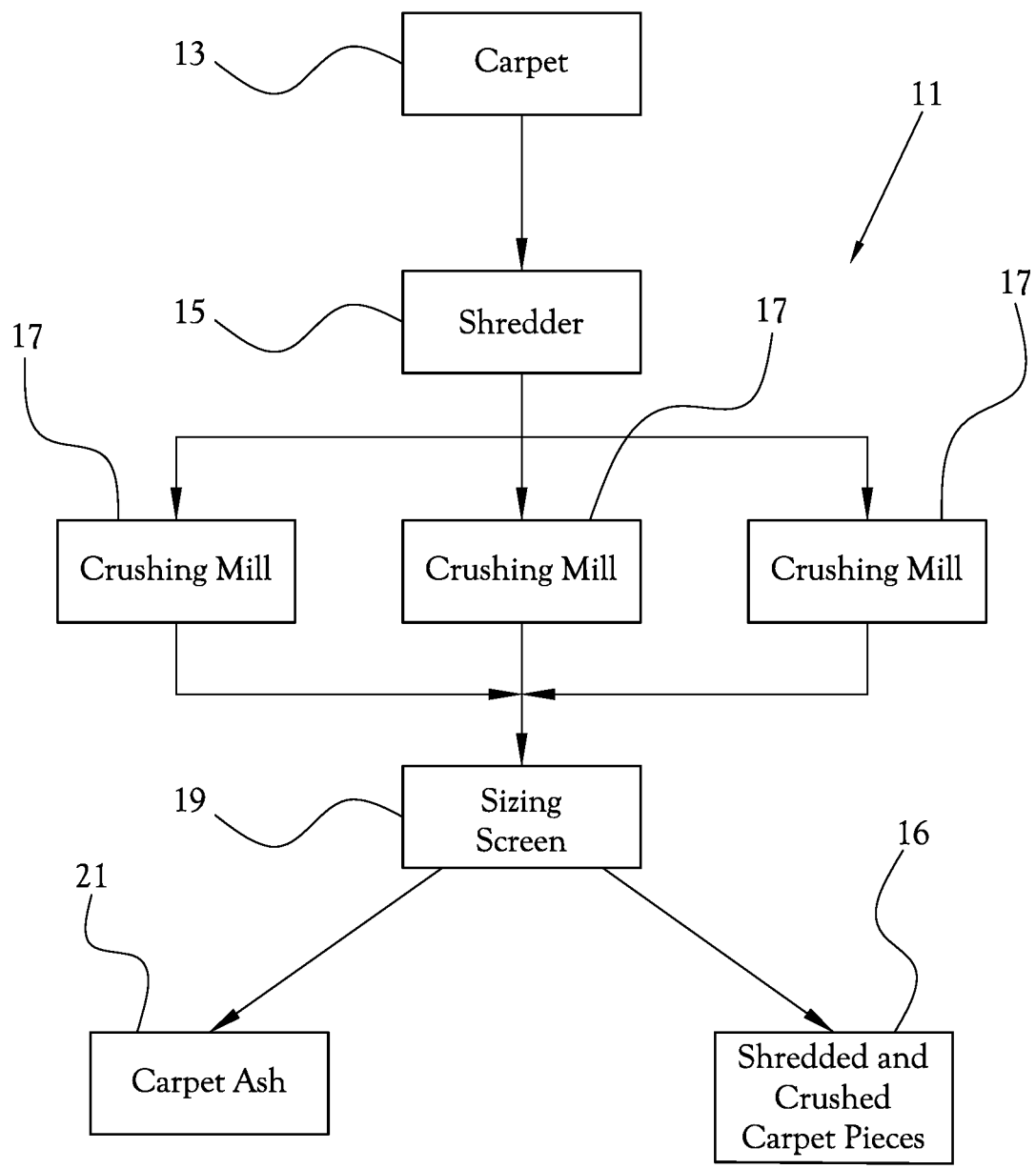
FIG. 2 is a detailed flow diagram showing various operations associated with a pre-processing operation according to one embodiment of a carpet recycling process and method in accordance with several features of the present general inventive concept.

With reference to FIG. 2, in several embodiments, the operation of pre-processing 11 the raw carpet involves reducing the raw carpet into a plurality of smaller-sized carpet fragments, each carpet fragment having a size, for example, of between approximately one inch by one inch to three inches by three inches in area. In several embodiments, this pre-processing 11 is performed by subjecting the carpet to mechanical shredding using a shredder or similar device. In the illustrated embodiment, a raw carpet 13 is fed into a shredder 15 and the shredder is activated, whereupon the raw carpet is reduced to shredded carpet exhibiting the above-discussed approximate one-to-three-inch size range. Thereafter, the shredded carpet is transferred to one or more crushing mills 17, such as for example one or more high-speed hammer mills or other similar devices, whereupon the shredded carpet is subjected to crushing. The crushing mills 17 crush at least a portion of the carpet ash in the carpet, thereby liberating the crushed portion of carpet ash from the remainder of the shredded carpet. Thereafter, the shredded and crushed carpet is passed along a sizing screen 19, whereupon the sizing screen separates at least a portion of the liberated carpet ash 21 from the remainder of the shredded and crushed carpet 16. In various embodiments, the sizing screen 19 is accomplished by providing a vibrator screen, of the type known to one of skill in the art. However, it is not the intention of the applicant to limit the method 10 of the present general inventive concept to use of any particular type of device to accomplish the sizing screen 19, and those skilled in the art will recognize other suitable devices which may be used without departing from the spirit and scope of the present general inventive concept.

Figure 3:
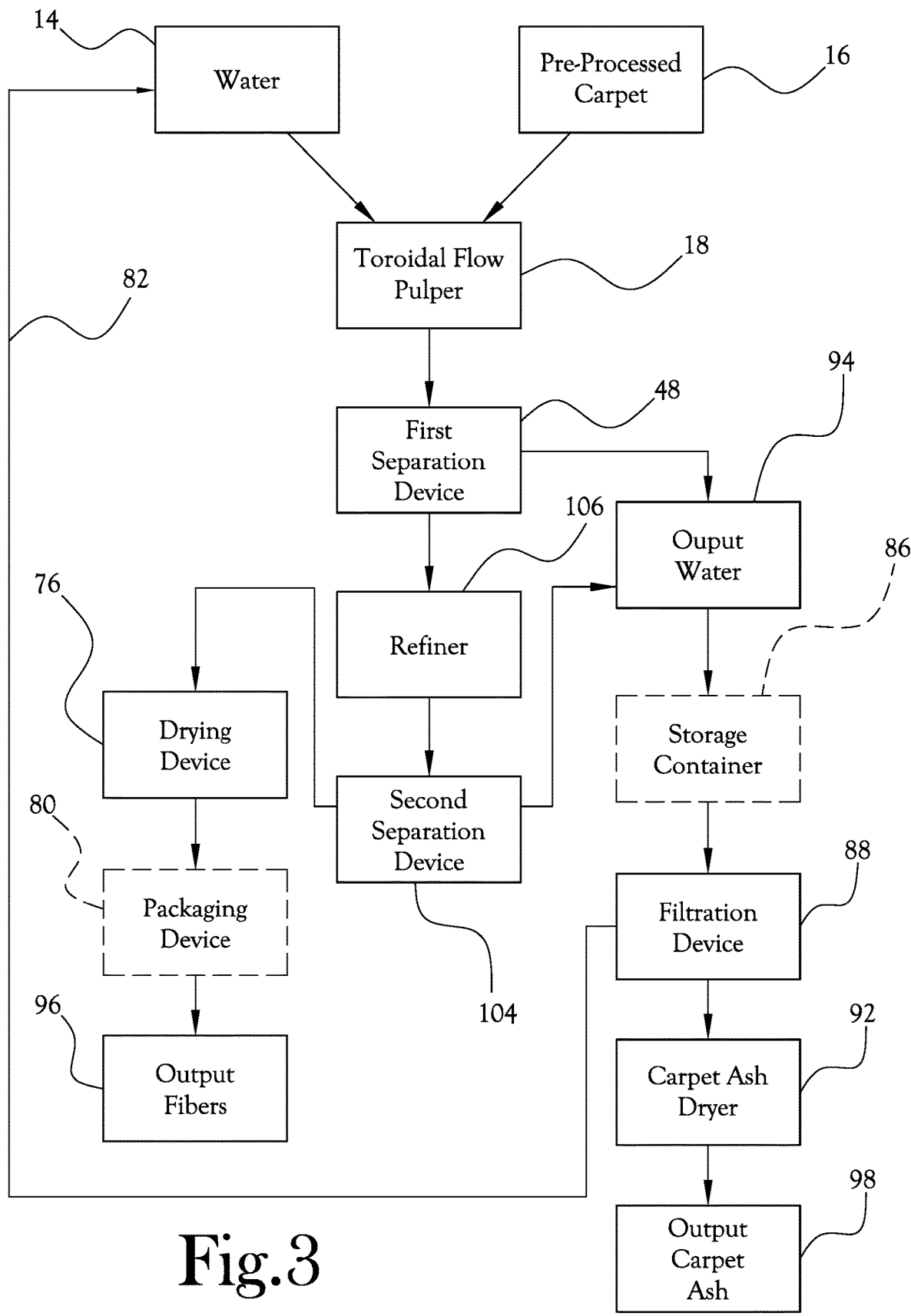
FIG. 3 is a schematic diagram illustrating several devices useful in performing several embodiments of a carpet recycling process and method.
Figure 4:
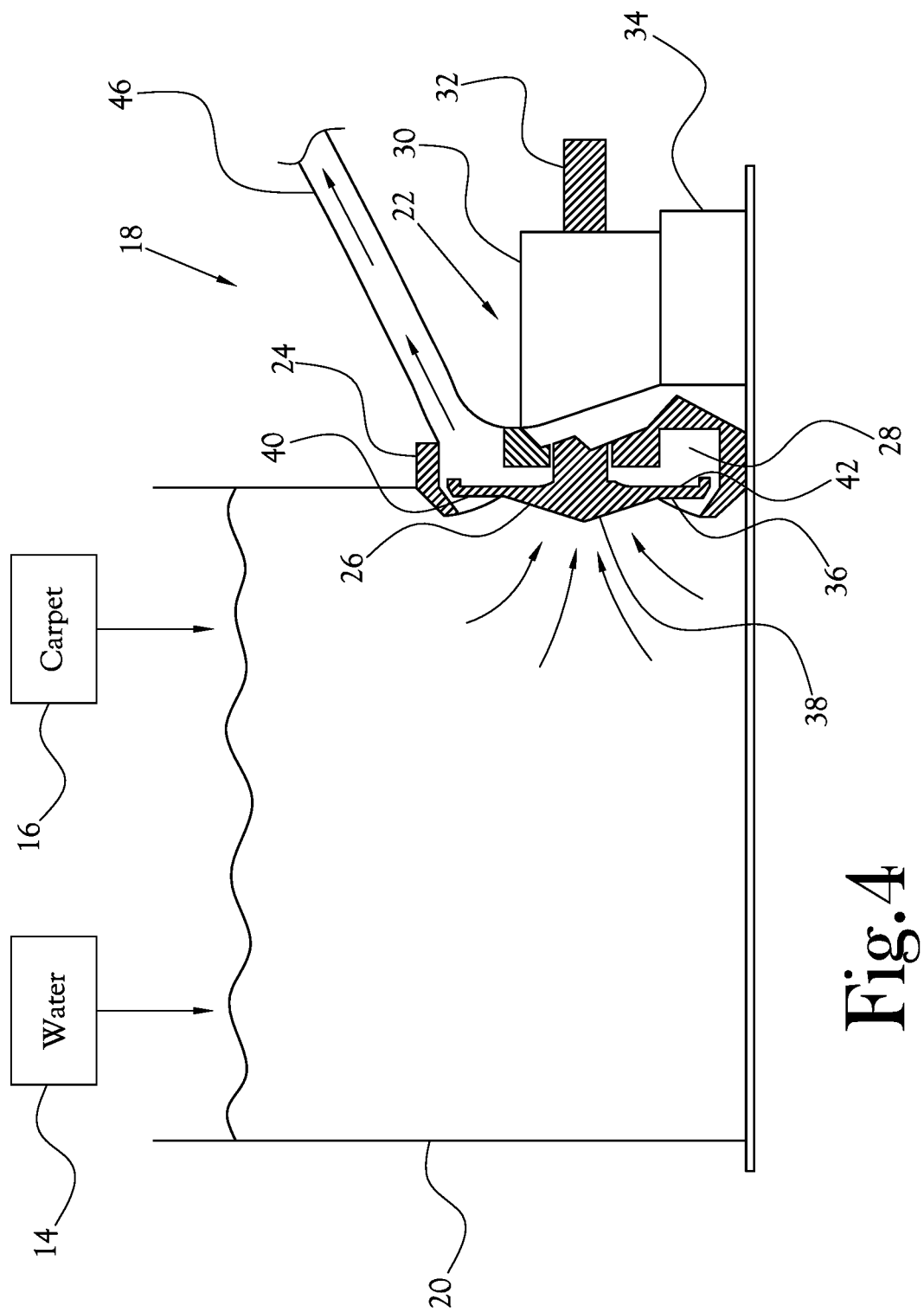
FIG. 4 is a cross-sectional schematic view of one embodiment of a toroidal flow pulper useful in performing several embodiments of a carpet recycling process and method.
Figure 5:
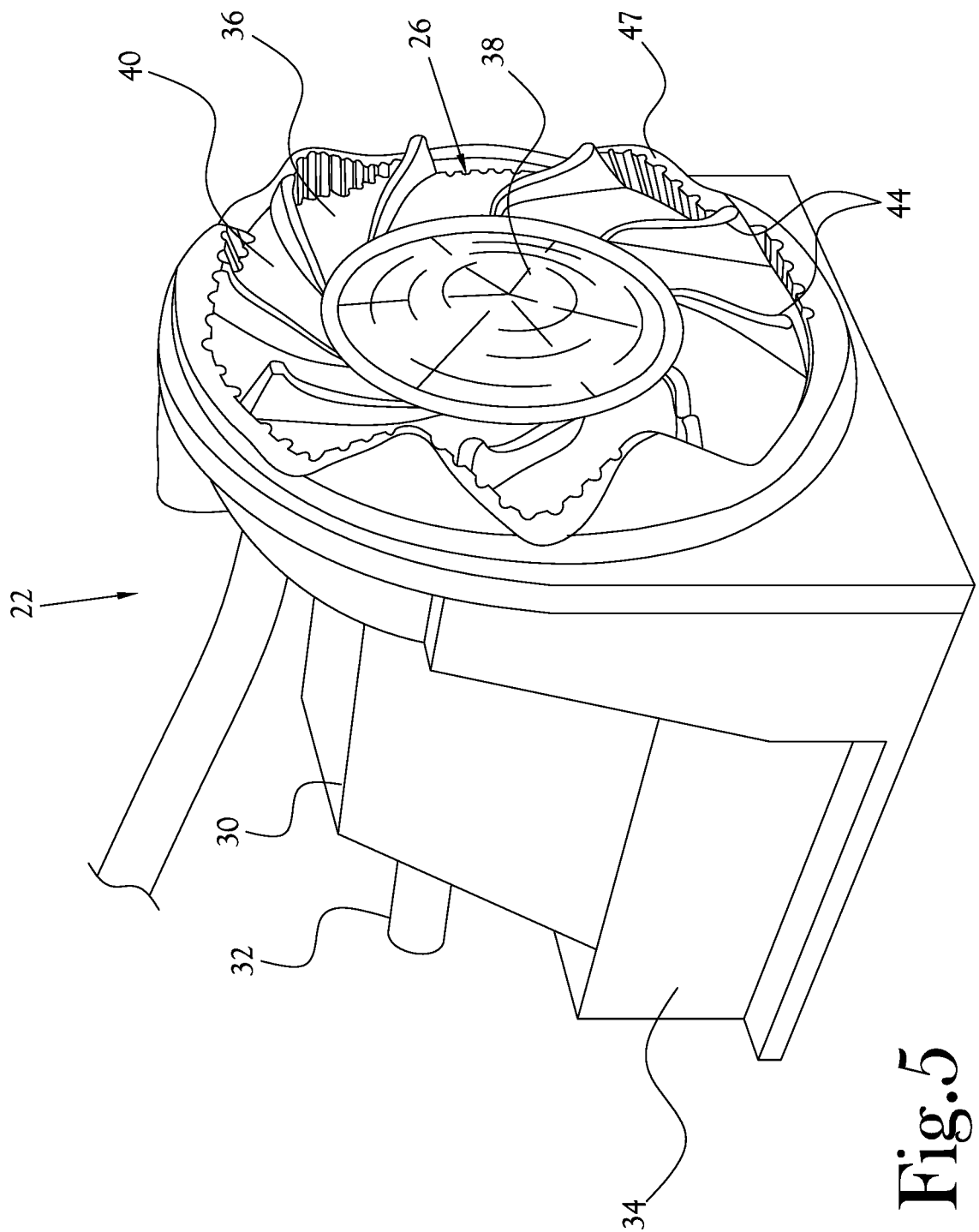
FIG. 5 is a partial perspective cutaway view showing the rotor portion of a toroidal flow pulper of the type depicted in FIG. 4.
Figure 6:
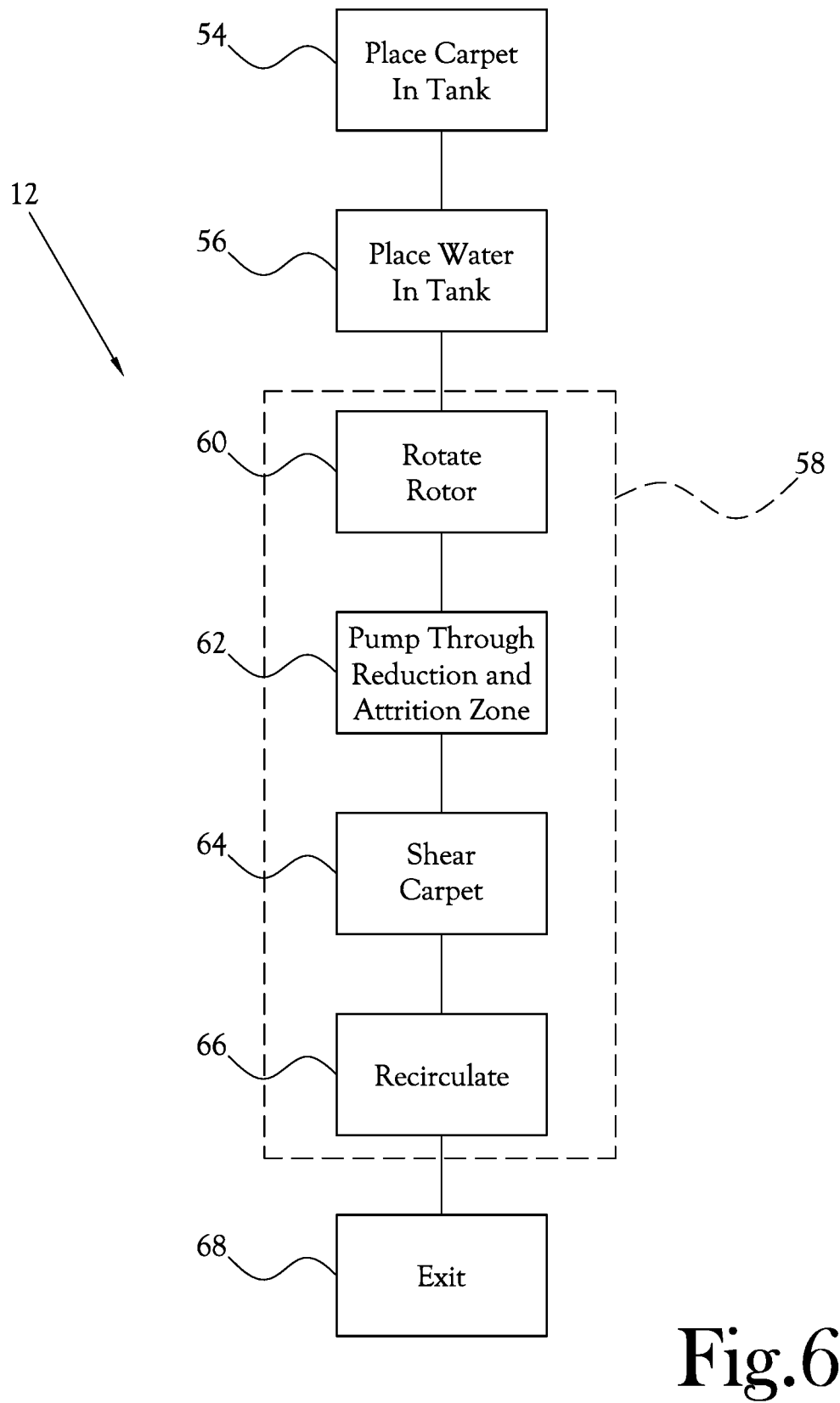
FIG. 6 is a more detailed flow diagram showing various operations associated with a disintegration operation according to one embodiment of a carpet recycling process and method in accordance with several features of the present general inventive concept.

With reference to FIGS. 1 and 3, in several embodiments, following the initial pre-processing operation 11, the shredded and crushed carpet is disintegrated 12 into its constituent carpet fibers, remaining carpet ash, and other constituent materials. In several embodiments, the operation of disintegrating 12 the pre-processed carpet is performed by further processing the pre-processed carpet 16 with an amount of water 14 in a toroidal flow pulper 18. One such toroidal flow pulper 18 that has been used with success is manufactured and sold by Bolton Emerson Americas, LLC and is marketed under the brand name "Tornado." As shown in FIGS. 4-6, in one embodiment, the toroidal flow pulper 18 comprises generally a tank 20 which is sized and shaped to allow a large volume of water 14 to be placed 56 therein, and into which the pre-processed carpet 16 may be placed 54. The tank 20 is in fluid communication with a pulper 22 that includes a stationary stator 24 and a nested, rotatable rotor 26 which cooperates with the stator 24 to define a reduction and attrition zone 28 therebetween. A motor 30 is provided to rotate a drive shaft 32, which is in turn coupled to the rotor 26. In several embodiments, a linear translation mechanism 34 is provided to allow selective repositioning of the motor 30, drive shaft 32, and rotor 26 in relation to the stator 24, such that the overall size of the reduction and attrition zone 28 is selectively adjustable.

Referring now to FIG. 5, the rotor 26 includes a generally circular plate 36 having a nose cone 38 extending from a central portion of a front surface 40 thereof. The drive shaft 32 is coupled to the circular plate 36 at a central portion of the rear surface 42 thereof. A set of blades 44 are provided in a configuration projecting outwardly from the front surface 40 of the plate 36 and extending generally radially outwardly from the nose cone 38 along the plate front surface 40. In the illustrated embodiment, each of the blades 44 extends along the plate front surface 40 in a generally arced path, such that rotation of the rotor 26 in relation to the stator 24 creates a toroidal flow within the tank 20, thereby agitating the contents of the tank 20, while simultaneously drawing water 14 and pieces of carpet 16 into and through the reduction and attrition zone 28.

Referring to FIG. 6, in one embodiment of the method 10, the disintegration 12 of the pre-processed carpet 16 may be accomplished by placing the pieces of pre-processed carpet and water, 54, 56 within the tank 20. It will be noted that, in the embodiment shown in FIG. 6, the carpet is placed 54 in the tank, followed by the water 56. However, these two operations may occur in any order, or simultaneously, without departing from the spirit and scope of the present general inventive concept. Thereafter, the motor 30 is activated 58, thereby rotating 60 the rotor 26 in relation to the stator 24 and causing the water 16 and carpet 14 to be pumped 62 through the reduction and attrition zone 28. As water 16 and carpet 14 are pumped 62 into and through the reduction and attrition zone 28 by the rotor 26, the blades 44 interact with a plurality of stator lobes 47 defined in a corresponding circular arrangement by the stator 24 to create a scissoring effect, thereby further shearing 64 the pieces of pre-processed carpet 16 into even smaller pieces. Thereafter, the sheared smaller pieces of carpet 16 and water 14 are recirculated 66 into the tank 20, until such a time as the sheared pieces of carpet 16 and water 14 are permitted to exit 68 the reduction and attrition zone 28 via a conduit 46 (see FIG. 4) which is in fluid communication with the reduction and attrition zone 28.

It will be understood that, whereas certain prior art devices having blade assemblies are not suitable for disintegrating wet carpet, the toroidal flow pulper 18 as described above and in the accompanying figures can disintegrate carpet that starts wet or dry into carpet fibers and carpet backing without becoming tangled and jamming. However, it will also be understood by one of skill in the art that the degree to which the pre-processed carpet 16 is further sheared by the toroidal flow pulper 18 may vary depending upon a large number of factors, including but not limited to the relative size of the various components of the toroidal flow pulper 18, the speed at which the rotor 26 rotates in relation to the stator 24, the selected size of the reduction and attrition zone 28, the initial sizes of the pieces of pre-processed carpet 16 that are achieved through the above-discussed pre-processing operation, and the number of times the pre-processed carpet 16 is recirculated through the reduction and attrition zone 28. However, it will generally be recognized that the toroidal flow pulper 18 as described above and in the accompanying figures is capable of dividing carpet into pieces having sizes as large as a few square inches in area, and is also capable of disintegrating the carpet 16 into its component mixed carpet fibers and carpet ash, and is further capable of reducing the size of the fibers themselves. Accordingly, with regard to use of the above-discussed toroidal flow pulper 18 manufactured and sold by Bolton Emerson Americas, LLC and marketed under the brand name "Tornado" to accomplish the disintegration operation 12 of the method 10, in several embodiments of the method 10, such disintegration 12 of the pre-processed carpet 16 is accomplished by further processing the pre-processed carpet 16 through the toroidal flow pulper 18 for approximately five (5) to ten (10) minutes with the rotor 26 rotating at approximately four hundred thirty (430) rounds per minute. In one embodiment, the pre-processed carpet 16 is processed through the toroidal flow pulper 18 for six (6) minutes with the rotor 26 rotating at approximately four hundred thirty (430) rounds per minute.

Referring to FIGS. 1 and 3, during the above-described disintegration operation 12, the pieces of pre-processed carpet 16 and water 14 are combined and transformed into a liquid slurry generally comprising water 14, mixed carpet fibers, and carpet ash. More specifically, the various fine particles comprising the remaining carpet ash of the pre-processed carpet 16 become either dissolved or suspended in the water 14, while the coarser mixed carpet fibers are suspended in the mixture of water 14 and carpet ash. Accordingly, following the operation of disintegrating 12 the carpet, the contents in the toroidal flow pulper 18 are transferred to a first separation device 48 for a first separation 50 of the mixed carpet fibers from at least a portion of the mixture of water 14 and carpet ash.

The first separation device 48 may include one or more of any of a variety of known devices which are suitable to accomplish separation 50 of the mixed carpet fibers from at least a portion of the mixture of water 14 and carpet ash, including but not limited to various types of liquid presses, such as for example a belt press, a filtration device, a screening device such as a dewatering screen, or the like. For example, in several embodiments, the first separation device 48 is provided by a washer comprising generally a screening device and a water supply. However, it is not the intention of the applicant to limit the method 10 of the present general inventive concept to use of any particular type of device to accomplish separation 50 of the mixed carpet fibers from the mixture of water 14 and carpet ash.

In some embodiments, the first separation device 48 is provided by a washer comprising a screening device which includes generally a screening chamber that is lined with a series of apertures sized to separate the carpet fibers from the carpet ash. It will be recognized that the particular aperture sizes can vary without departing from the scope or spirit of the present general inventive concept. However, it will be understood that the apertures are generally sized to substantially retain the carpet fibers within the screening chamber while permitting smaller carpet ash particles and liquid to pass therethrough. For example, in one embodiment, the apertures defined by the screening chamber are each sized to approximately one (1) micron.

Figure 7:
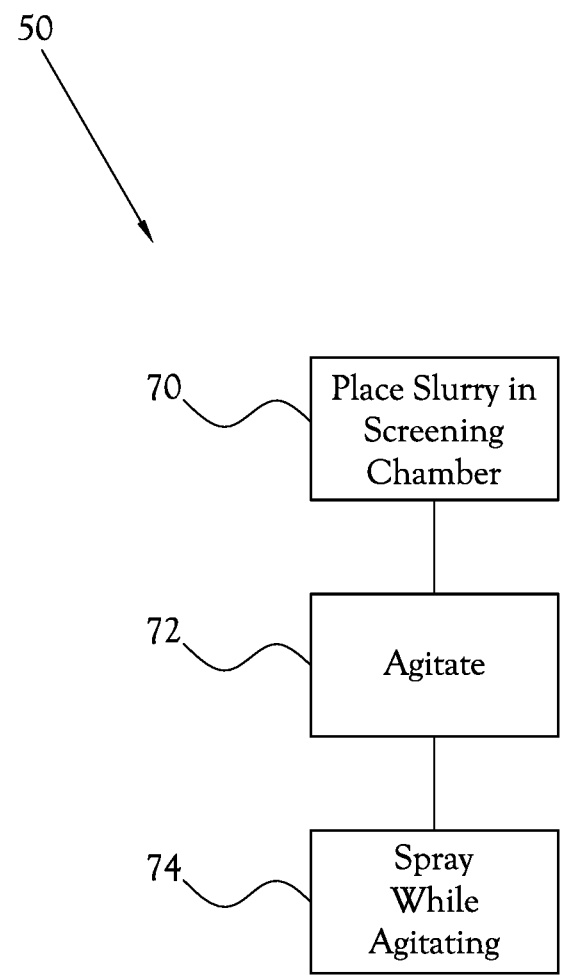
FIG. 7 is detailed flow diagram showing various operations associated with a separation operation according to one embodiment of a carpet recycling process and method in accordance with several features of the present general inventive concept.

Referring to FIG. 7, in one embodiment, the first separation operation 50 includes placing 70 the liquid slurry of mixed carpet fibers, water, and carpet ash within the screening chamber, which is then rotated or otherwise agitated 72 while additional water is sprayed 74 inside. The agitation 72 of the screening chamber together with the additional water spray serves to wash the carpet fibers and urge the accompanying water and carpet ash to pass through the apertures defined in the screening chamber, leaving the mixed carpet fibers within the inner screening chamber. In the embodiment of FIG. 7, the agitation 72 of the screening chamber is illustrated as occurring prior to the operation of spraying 74 additional water into the screening chamber. However, it will be understood that the operations of agitation 72 and spraying 74 may occur in any order, and may also occur simultaneously, without departing from the spirit and scope of the present general inventive concept. It will further be recognized that, depending upon the type of device utilized in the separation operation 50, following the separation operation 50, the carpet fibers may still retain a significant moisture content, sometimes as much as ninety (90) percent or more by weight.

Following the separation operation 50, the carpet fibers are subjected to further refinement 100 in order to further remove carpet ash and other backing materials from the carpet fibers, and to further shorten the carpet fibers. In several embodiments, this refinement is performed by "beating" the carpet fibers in the presence of liquid in order to further separate the carpet ash and backing materials and to promote dissolution of the non-carpet fiber components of the carpet into the liquid. In several embodiments, the refinement operation 100 is performed using a conical refiner 106 of the type known to one of skill in the art. It will be recognized that numerous other types of devices exist which may be used to accomplish the refinement operation 100 without departing from the spirit and scope of the present general inventive concept. In several embodiments in which a conical refiner 106 is used, the conical refiner includes generally a chamber having metal bars mounted around the inside thereof. The above-discussed carpet fibers that have been subjected to the first separation operation 50 are pumped into the chamber of the conical refiner 106 at high pressure in order to create an abrasive effect, thereby abrading the carpet fibers with the metal bars. This abrasive "beating" of the carpet fibers may, in various applications, result in shortening of the carpet fibers, and may also result in separation of additional carpet ash from the carpet fibers and/or dissolution of the carpet ash into the liquid remaining in the carpet fiber mixture. One conical refiner that has been used with success is manufactured and sold by Bolton Emerson Americas, LLC and is marketed under the brand name "CLAFLIN." However, it is not the intention of the applicant to limit the method 10 of the present general inventive concept to use of any particular type of device to accomplish refinement 100 of the carpet fibers.

Following the above-discussed refinement operation 100, the refined carpet fibers are subjected to a second separation operation 102. Similar to the first separation operation 50 described above, the second separation operation 102 is configured to separate at least a portion of the liquid containing the separated and dissolved carpet ash and other backing components from the refined carpet fibers. And, similar to the first separation operation 50 described above, the second separation operation 102 may be accomplished using a separation device which may include one or more of any of a variety of known devices which are suitable to accomplish separation of the carpet fibers from at least a portion of the mixture of water and carpet ash, including but not limited to various types of liquid presses, such as for example a belt press, a filtration device, a screening device, or the like. In several embodiments, the second separation operation 102 is accomplished by transferring the refined carpet fibers to second separation device 104, such as for example any of the various types of devices described above with regard to the first separation operation 50. In several embodiments, the second separation device is a centrifuge, such as for example a basket centrifuge. However, it will be understood that numerous other devices are suitable for providing the second separation device 104, and such devices may be used without departing from the present general inventive concept. In one embodiment in which the second separation device 104 is a basket centrifuge, the basket centrifuge spins the carpet materials in order to separate water from the fibrous carpet materials by density. Specifically, the moisture-bearing fibrous materials are spun in the basket centrifuge such that the moisture is urged to the bottom of the basket centrifuge and the less-dense fibrous materials collect near the top of the basket centrifuge.

In various other embodiments, the second separation operation 102 is accomplished using various other types of separation devices. For example, in one embodiment, the second separation operation 102 is accomplished by, following the above-discussed refinement operation 100, returning the refined carpet fibers to the same first separation device 48 that was used in the above-discussed first separation operation 50 and repeating the above-discussed washing and screening operations. In other embodiments, the second separation operation 102 is accomplished using an additional second separation device 104 selected from one or more of the various types of devices described above with regard to the first separation operation 50. In any case, the second separation operation 102 produces a relatively clean mass of refined carpet fibers which may, in many embodiments, retain a significant moisture content, sometimes as much as ninety (90) percent or more by weight.

With reference again to FIGS. 1 and 3, following the second separation operation 102, in which the mixed carpet fibers are separated from the mixture of water and carpet ash, the mixed carpet fibers are further dried 52. In some embodiments of the present invention, the mixed carpet fibers are transferred from the second separation device 104 to a drying device 76 in order to remove additional moisture content still contained within the fibrous carpet materials. In such embodiments, the carpet fibers may be laid out on an appropriate drying surface and/or agitated or turned in order to facilitate even and more complete drying. In one embodiment, the drying device 76 is provided by an air dryer, tumble dryer, conveyor, or other suitable device by which the carpet fibers may be laid out on an appropriate drying surface and/or agitated or turned in order to facilitate even and more complete drying. In certain embodiments, the carpet fibers may thus be allowed to "air dry" to achieve a dried state.

In an optional step following the operation of drying 52 the fibrous carpet materials, the dried carpet fibers are packaged 78 into transportable units. In some embodiments, the mixed carpet fibers are collected from the drying device 76 and transferred to a suitable packaging device 80, such as for example a compacting apparatus. In some embodiments, a bailer (not shown) is utilized whereby a collection of mixed carpet fibers are placed in a compacting zone where a compacting member compresses the carpet fibers into a bale that can be circumferentially tied and easily loaded onto a pallet or like transporting unit, or into a "pellet" that can be easily stacked and transported. In their compacted state, the mixed carpet fibers can then be easily transported for further use, such as for example for use as starting material in various industries. In any case, following drying 52 of the mixed carpet fibers, an output 96 of dried mixed carpet fibers is produced.

With reference to FIG. 3, it will be understood that, in certain embodiments, the first and second separation devices 48, 104, in addition to producing outputs of the above-described mixed carpet fibers, also produce outputs comprising a mixture of water and carpet ash 94 separated from the mixed carpet fibers. In some embodiments, the outputted water and carpet ash 94 separated from the carpet fibers by the second separation device 104 may be combined with the output of water from the first separation operation 50. Returning to FIG. 1, in several embodiments of the present general inventive concept, the mixture of water and carpet ash separated from the carpet fibers during the first and second separation operations 50, 102 is further processed 84 to isolate the carpet ash from the water in the mixture. For example, in some embodiments, such as the embodiment of FIG. 3, the mixture is optionally transferred and stored in a storage container 86 until enough has accumulated for further processing. Thereafter, the water and carpet ash mixture can be transported via pump or other suitable transportation device to a filtration device 88, such as for example a hydrocyclone or other such device suitable for isolating the carpet ash from the water in the mixture. Upon receiving the water and carpet ash mixture, the filtration device 88 separates the carpet ash particles from the water in the mixture.

In several embodiments, the filtration device 88 is provided by a hydrocyclone which includes a conically-shaped container which is adapted to spin about a central axis of the conically-shaped container, such that upon receiving the mixture, such spinning of the hydrocyclone encourages circulating separation of the carpet ash from the liquid. More specifically, because the carpet ash in the mixture has a density greater than water, spinning of the hydrocyclone encourages the carpet ash to fall through the bottom of the hydrocyclone while the water in the mixture is retained therein. In several embodiments, the state of the carpet ash falling through the bottom of the hydrocyclone is a moist solid. Thus, it will be understood that, while the hydrocyclone serves to isolate the solid particles from a portion of the water in the mixture, the solid particles may contain a certain quantity of moisture. However, those skilled in the art will recognize numerous other devices which may be used to accomplish the filtration device 88 without departing from the spirit and scope of the present general inventive process.

Referring again to FIG. 3, following the above-discussed isolation process 84, the separated water may be optionally directed 82 back for additional use in the toroidal flow pulper 18 for use in additional disintegration of carpet. In this manner, the water used in the various operations described above may be "recycled," thereby reducing the need to consume fresh water through performance of the method 10. However, while advantageous in many respects, it will be understood that such optional direction 82 of the outputted water 94 is not necessary to accomplish the present general inventive concept.

After isolating the carpet ash 84, the carpet ash is dried 90 in order to purge it of any remaining moisture. Thus, an output of dried carpet ash 98 is produced. In some embodiments, the primarily-solid carpet ash that is isolated 84 by the isolation device 88 is then transferred to a carpet ash dryer 92, such as for example a rotary vacuum filter. The rotary vacuum filter filters the semi-solid mixture by rotating an apertured drum inside of a housing. Washing water is introduced to clean the semi-solid mixture which is urged by a vacuum force against the exterior of the rotating drum, within the housing. The liquid accompanying the solid carpet ash, as well as the washing water introduced inside the housing, is sucked through the apertured, rotating drum, leaving only solid particles adhered against the exterior of the apertured drum. The solid ash may then be preserved while the water may be collected as output water and recycled back to the toroidal flow pulper 18 as discussed above. In one embodiment, after processing the carpet ash through the rotary vacuum filter as discussed above, the carpet ash is then sent to a thermal drying apparatus where electric heat and air cooperate to create a blow-drying effect that is applied directly to the carpet ash. However, numerous suitable devices and configurations for drying 90 the carpet ash to create the output of dried carpet ash 98 will be readily apparent to one of suitable skill in the art, and such other devices and configurations may be used without departing from the spirit and scope of the present general inventive concept. The separated and dried carpet ash may, optionally, be combined with the additional carpet ash separated from the carpet during the above-discussed pre-processing operation.

From the foregoing, it will be recognized that a carpet recycling method has been provided in accordance with various embodiments of the present general inventive concept. Specifically, the carpet recycling process enables a user to recycle carpet pieces and harvest at least two outputs, namely, an output of mixed carpet fibers and an output of predominantly calcium carbonate carpet ash. In several embodiments, the mixed carpet fibers recovered by the carpet recycling method disclosed herein contain an ash content that is less than five (5) percent, which presents a significant improvement over other known carpet recycling methods.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A carpet recycling method comprising the operations of:
   preprocessing a carpet comprising fibrous carpet materials and carpet ash by:
      dividing the carpet into a plurality of pieces less than nine square inches in area but greater than one square inch in area;
      crushing the pieces of carpet to release crushed carpet ash from the pieces of carpet; and
      performing a first separation operation to separate at least a portion of the crushed carpet ash from the pieces of carpet;
   in a toroidal flow pulper, disintegrating the pieces of carpet in a quantity of liquid to form a slurry of liquid, fibrous carpet materials, and disintegrated carpet ash;
   performing a second separation operation to separate at least a portion of said liquid and disintegrated carpet ash from said fibrous carpet materials;
   refining the fibrous carpet materials by subjecting the fibrous carpet materials to abrasive beating in the presence of additional liquid to liberate at least a portion of the carpet ash remaining in the fibrous carpet materials following the second separation operation; and
   performing a third separation operation to separate at least a portion of the additional liquid and liberated carpet ash from the fibrous carpet materials;
   drying said fibrous carpet materials;
   isolating at least a portion of said disintegrated carpet ash from said liquid and at least a portion of said liberated carpet ash from said additional liquid; and
   drying said isolated carpet ash;
   whereby a first output comprising crushed carpet ash, a second output comprising dried separated fibrous carpet materials and a third output comprising dried carpet ash are produced.

2. The method of claim 1, said operation of dividing the carpet into a plurality of pieces comprising shredding the carpet into a plurality of pieces less than three inches by three inches in area.

3. The method of claim 2, said operation of crushing the pieces of carpet occurring
   in at least one crushing mill.

4. The method of claim 1, wherein said third separation operation comprises, in a basket centrifuge, spinning the fibrous carpet materials in order to separate liquid and liberated carpet ash from the fibrous carpet materials by density.

5. The method of claim 4, wherein said toroidal flow pulper comprises:
   a tank sized and shaped to receive said carpet and said quantity of liquid; and
   a pulper in fluid communication with said tank.

6. The method of claim 5, wherein said toroidal flow pulper further comprises:
   a stationary stator; and
   a rotatable rotor having a plurality of blades defined thereon, said rotor being nested within and cooperating with said stator to define a reduction and attrition zone therebetween, said rotor being coupled to a drive shaft, said drive shaft being in operable communication with a motor configured to rotate said drive shaft and said rotor;
   whereby rotation of said rotor in relation to said stator operates to shear said carpet while simultaneously drawing said liquid and said carpet into and through said reduction and attrition zone, thereby disintegrating said carpet to form said slurry.

7. The method of claim 6, said operation of disintegrating carpet being performed by:
   placing said carpet and said quantity of liquid in said tank of said toroidal flow pulper;
   rotating said rotor in relation to said stator;
   pumping said carpet and said liquid through said reduction and attrition zone, thereby shearing said carpet; and
   recirculating said sheared carpet and said liquid to said tank.

8. The method of claim 7 further including the operation of packaging said dried separated fibrous carpet materials into transportable units.

9. The method of claim 8, said operation of packaging said dried separated fibrous carpet materials being performed by compacting said dried and separated fibrous carpet materials into a pellet.

10. The method of claim 9, said operation of separating at least a portion of said liquid and disintegrated carpet ash from said fibrous carpet materials comprising:

placing said slurry in a screening chamber defining a series of apertures sized to allow said liquid and said carpet ash to pass through said apertures but to limit said fibrous carpet materials from passing therethrough;

agitating said screening chamber; and applying additional liquid to an interior of said screening chamber to urge said liquid and said carpet ash through said apertures.

11. The method of claim 10, said operation of isolating at least a portion of said carpet ash from said liquid comprising:

placing said liquid and carpet ash in a hydrocyclone defining a conically-shaped chamber adapted to rotate about a central axis thereof;

rotating said chamber of said hydrocyclone, thereby urging circulating separation of said at least one portion of said disintegrated carpet ash from said liquid of said slurry; and allowing said at least one portion of said disintegrated carpet ash to fall from a lower portion of said chamber.

12. The method of claim 11, said operation of drying said isolated carpet ash being performed by processing said isolated carpet ash through at least one of a vacuum filter and a thermal drying apparatus.

13. The method of claim 12 wherein at least one of said operations of drying said separated fibrous carpet materials, isolating at least a portion of said carpet ash from said slurry, and drying said isolated carpet ash produces a third output comprising said liquid, said method further comprising the operation of directing said third output to said toroidal flow pulper for use in disintegrating additional carpet.

14. The method of claim 13, wherein an output of liquid and disintegrated carpet ash from said second separation operation is combined with an output of liquid and liberated carpet ash from said third separation operation to form a combined liquid and carpet ash output.

15. The method of claim 14, further comprising the operation of filtering the combined liquid and carpet ash output to form an output of filtered liquid and an output of carpet ash.

16. The method of claim 15, further comprising the operation of directing the filtered liquid to the toroidal flow pulper for use in disintegrating additional carpet.

* * * * *